United States Patent [19]
Kazuo

[11] 4,060,766
[45] Nov. 29, 1977

[54] AUTOMATIC SIGNAL SWITCHING APPARATUS FOR A COMBINED TRANSCEIVER AND RADIO OR TAPE RECORDER SET

[75] Inventor: Arai Kazuo, Kitamoto, Japan

[73] Assignee: Nissan Denshi Company Limited, Omiya, Japan

[21] Appl. No.: 684,269

[22] Filed: May 7, 1976

[51] Int. Cl.² .............................................. H04B 1/38
[52] U.S. Cl. ..................................... 325/22; 325/302; 325/303; 325/304; 325/311
[58] Field of Search .................... 325/15, 21, 22, 66, 325/302, 303, 304; 179/1 SW; 307/244, 259

[56] References Cited

U.S. PATENT DOCUMENTS

| | | |
|---|---|---|
| 2,968,718 | 1/1961 | McKesson ............................ 325/304 |
| 3,493,681 | 2/1970 | Richards ............................. 179/1 SW |
| 3,599,099 | 8/1971 | Tatebayashi ......................... 325/311 |

Primary Examiner—Benedict V. Safourek

[57] ABSTRACT

An improved automatic switching system for switching between two sources of audio signals in a combination transceiver set and radio or tape recorder set. A transistor in the squelch control circuit of the transceiver set switches the audio signals from either the transceiver set or from the radio or tape recorder set through respective switching diodes to an output amplifier circuit, thereby reducing the complexity and cost of the system.

8 Claims, 4 Drawing Figures

AUTOMATIC SIGNAL SWITCHING APPARATUS FOR A COMBINED TRANSCEIVER AND RADIO OR TAPE RECORDER SET

CROSS REFERENCES TO RELATED APPLICATION

U.S. Pat. No. 3,971,985, issued on July 27, 1976, and assigned to the assignee of this application contains a detailed description of another embodiment of an automatic switching system for a combined transceiver and radio or tape recorder set.

BACKGROUND OF THE INVENTION

This invention relates to an improvement in an automatic audio signal switching system for a combined transceiver and radio or tape recorder set, and more particularly to an improvement of the system described in the above-mentioned patent. Such combined transceiver and radio or tape recorder set, employs very complicated circuits, including a large number of transistors, thus resulting in a relatively complicated and expensive construction.

SUMMARY OF THE INVENTION

It is therefore the object of this invention to provide an automatic switching system having simplified circuits with fewer transistors and which is less expensive than the system disclosed in the above patent.

According to the present invention, an audio signal switching system is provided for a combined transceiver and radio or tape recorder set in which the collector of a switching transistor in a transceiver squelch control circuit is connected to the base of a switching transistor in the radio or tape recorder side so that a bias voltage developed at the collector of the former switching transistor, when a transceiver signal is received, can be supplied to the base of the latter switching transistor to carry out such switching operation. Both switching transistors are connected to an output amplifier and speaker through respective switching diodes instead of through amplifying transistors as disclosed in the above patent.

BRIEF DESCRIPTION OF THE DRAWING

This invention will be illustrated in detail by way of examples in the accompanying drawings, in which.

PREFERRED EMBODIMENT OF THE INVENTION

Figure 1:
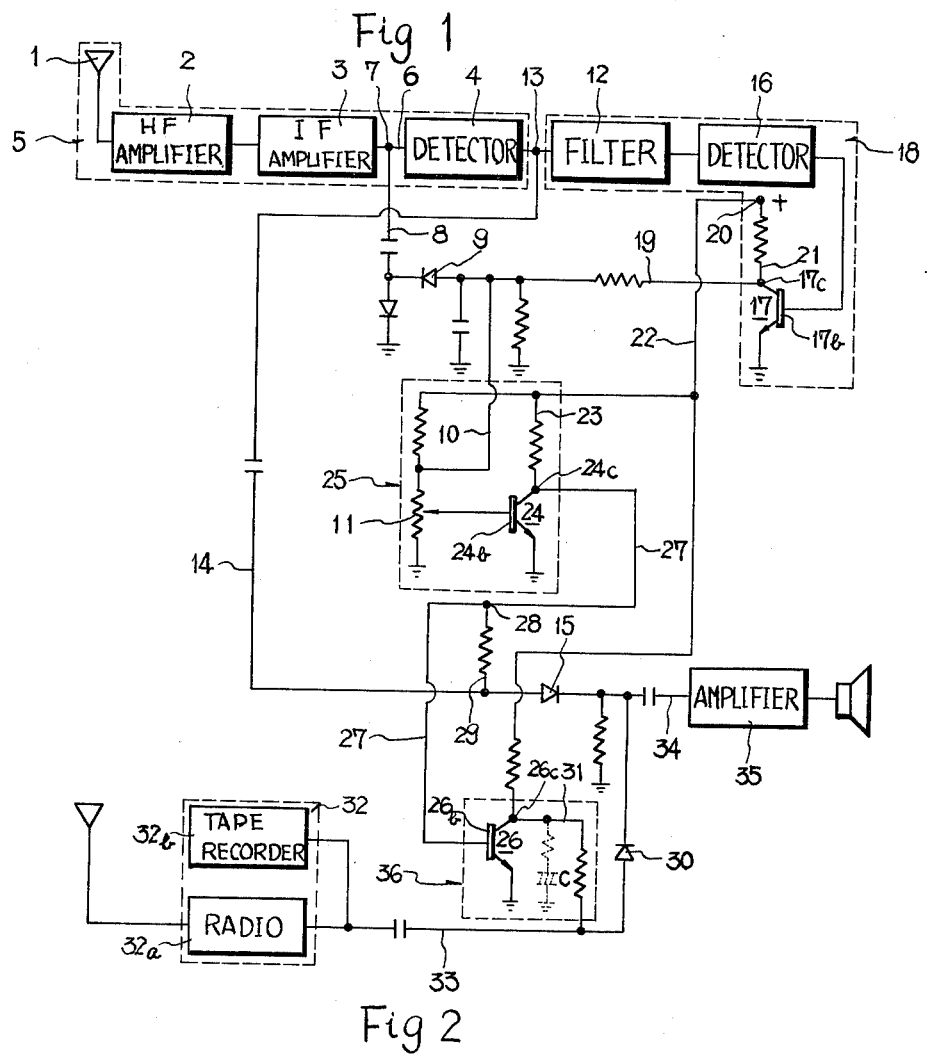
FIG. 1 is a schematic and block diagram of a combined transceiver and radio or tape recorder set which includes an automatic signal switching system in accordance with first embodiment of the present invention.

Referring to the drawings, particularly to FIG. 1, there is illustrated the first embodiment of the present invention which is capable automatically switching over audio signals in a combined transceiver and radio or tape recorder set. As shown in FIG. 1, a transceiver antenna 1, an HF amplifier 2, an IF amplifier 3 and a detector 4 constitute a receiving portion 5 as a whole. A branched circuit 8 from a junction 7 in a circuit 6 connecting the IF amplifier 3 to the detector 4 is connected through a detecting diode 9 and a circuit 10 to a variable resistor 11. Another branched circuit 14 from a junction 13 between the detector 4 and a filter 12 connects in series the receiver portion 5 to a switching diode 15. The filter 12 is so arranged that it can select only a preset station. The filter 12 constitutes, together with a detector 16 and a transistor 17, a station selecting portion 18 as a whole. The collector 17c of the transistor 17 is connected through a circuit 19 and a circuit 10 to the variable resistor 11. A current source 20 is connected through a circuit 21 to the collector 17c of the transistor 17. The current source 20 is also connected through circuits 22 and 23 to the collector 24c of a switching transistor 24. The variable resistor 11 constitutes, together with the switching transistor 24, a squelch control circuit 25 of the transceiver. A circuit 27 connects the collector 24c to the base of a switching transistor 26 of the radio or tape recorder side and is also connected at junction 28 through a branched circuit 29 to the switching diode 15. The collector 26c of the switching transistor 26 of the radio or the tape recorder side is connected through a circuit 31 to a switching diode 30 which in turn is connected through a circuit 33 to the output of the radio or tape recorder set 32. These diodes 15 and 30 are respectively connected to an amplifier 35. In the drawing, the reference numeral 36 denotes as a whole a switching circuit of the radio or tape recorder side which includes the switching transistor 26.

When a transceiver signal is received, the signal is applied partly from the junction 7 to the branched circuit 8 and partly from the junction 13 to the circuit 14. The signal applied through both junctions 7 and 13 to the filter 12 is station alone, to preset or desired station alone, detected again by the detecter 16 and input to the base 17b of the transistor 17. When the signal is input to the base 17b of the transistor 17, the transistor 16 is inactivated due to a positive voltage of the signal applied thereto and the positive voltage input to the collector 17c from the current source 20 through the circuit 21. Accordingly, the electric charge in the circuit 19 becomes zero. On the other hand, there flows a negative signal voltage through the branch circuit 8 and the diode 9 to the circuit 10. This negative signal voltage is further input through the variable resistor 11 to the base 24b of the switching transistor 24 in the squelch control circuit. To the collector 24c of the switching transistor 24 is input a positive voltage from the electric source 20 through the circuits 22 and 23. This positive voltage cuts off the transistor 24 together with the negative signal voltage which is input to the base 24b, thus developing a bias voltage at the collector 24c. This bias voltage is applied through circuits 27 and 29 to the switching diode 15 which in turn is activated to pass the transceiver signal from the circuit 14 to the amplifier 35. The bias voltage through the circuit 27 is input to the base 26b of the switching transistor 26 and, together with the positive voltage from the source 20 which is input through the circuit 22 to the collector 26c, inactivates the transistor 26. Upon inactivation of the transistor 26, the electric charge of the circuit 31 becomes zero. This in turn inactivates the switching diode 30 and thus interupts the output from the radio or tape recorder set 32.

When reception of a transceiver signal is completed, the transistor 17 becomes cut off and a bias voltage develops at the collector 17c. This makes the electric charge of the circuit 10 positive and results in inactivation of the switching transistor 24 in the squelch control circuit and that of the switching diode 15 of the transceiver side. On the other hand, the voltage input to the base 26b of the switching transistor 26 of the radio or tape recorder side becomes zero and the transistor 26 is activated. Thus, the electric charge of the circuit 31 is made positive to activate the switching diode 30 of the radio or tape recorder side. The audio signal input from the radio or tape recorder is thus applied to the amplifier 35.

Figure 2:
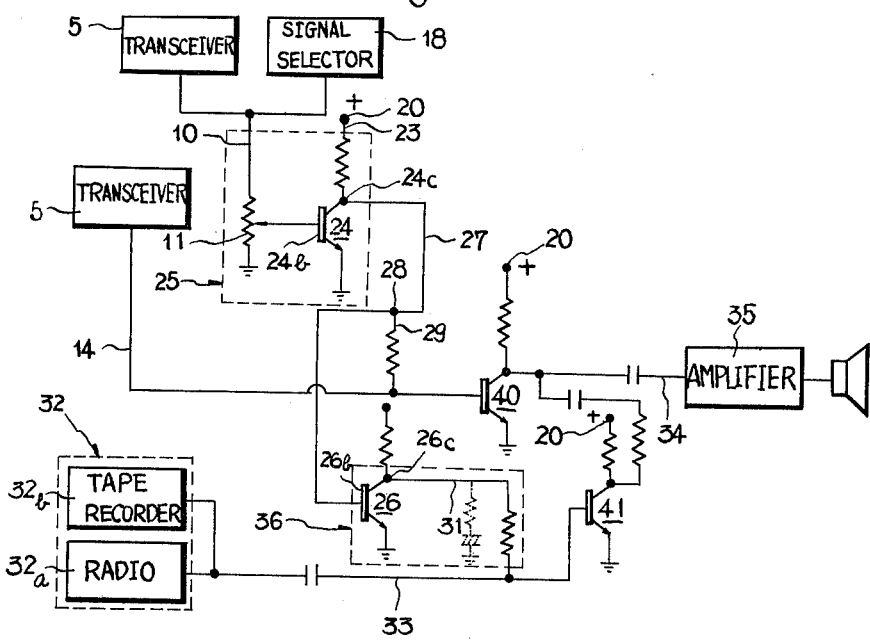
FIG. 2 is a schematic and block diagram of the circuit disclosed in the above noted U.S. Pat. No. 3,971,985.

FIG. 2 is a sketch of the combined schematic and block diagram of the above noted U.S. Pat. No. 3,971,985. As will be apparent from the above, the first embodiment in FIG. 1 is generally similar to that shown in said patent except two portions. That is to say, this embodiment also makes use of : (a) the signal selector 18, (b) the squelch control circuit 25, and (c) the switching circuit 36. However, it employs the switching diodes 15 and 30 instead of the amplifying transistors 40 and 41 respectively.

Figure 3:
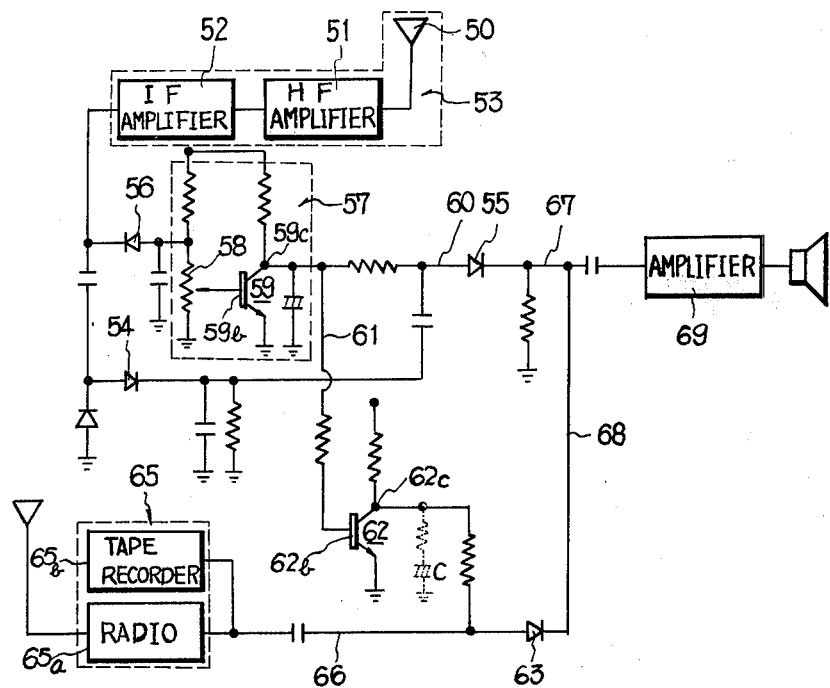
FIG. 3 is a schematic and block diagram showing a second embodiment of the present invention.

Referring to FIG. 3, another embodiment of this invention is illustrated which however lacks the signal selector 18 of the first embodiment. An transceiver antenna 50, an HF amplifier 51 and an IF amplifier 52 constitute a receiving portion 53 as a whole. The receiving portion 53 is connected through a detecting diode 54 to a switching diode 55. The receiving portion 53 is also connected through a negative rectifying diode 56 to a variable resistor 58 of s squelch control circuit 57. The squelch control circuit 57 includes therein a transister 59. The collector 59c of the switching transistor 59 in the squelch control circuit is connected through a circuit 60 to the switching diode 55. The collector 59c is also connected through a circuit 61 to a switching transistor 62 of the radio or tape recorder side. The collector 62c of the switching transistor 62 is connected through a circuit 64 to a switching diode 63 which in turn is connected through a circuit 66 to the output of the radio or tape recorder set 65. Both the switching diode 55 of the transceiver side and the switching diode 63 of the radio or tape recorder side are connected to an amplifier 69 respectively through circuits 67 and 68.

When such receiving portion receives a transceiver signal, as explained with the first embodiment, there are input a positive voltage from a source to the collector 59c of the switching transistor 59 in the squelch control circuit 58 and a rectified negative signal voltage to the base 59b. This makes the transistor 59 cut off and results in activation of the diode 55 to apply the transceiver signal to the amplifier 69. The transistor 62 is simultaneously inactivated to stop function of the diode 63 and thus the radio or tape recorder audio signal can not be applied to the amplifier 69.

When the reception of the transceiver signal is completed, the switching transistor 59 in the squelch control circuit is made grounded to inactivate the diode 55 and the switching transistor 62 of the radio or tape recorder side is made operative to activate the diode 63. Thus, the radio or tape recorder audio signal can be applied to the amplifier 69. The present embodiment is arranged to carry out the same switching operation as in the first embodiment without employment of the signal selecto 18.

Figure 4:
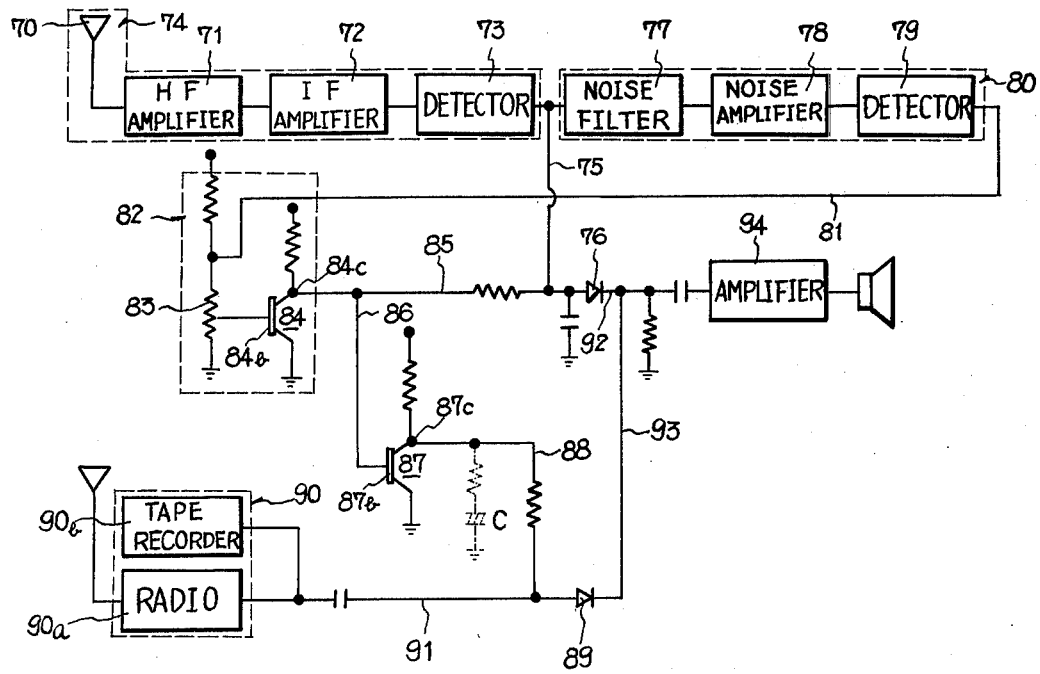
FIG. 4 is a schematic and block diagram showing a third embodiment of the present invention.

FIG. 4 shows the third embodiment of the present invention and it is characterized in that a noise output of the transceiver signal is amplified for switching purpose. An antenna 70, an HF amplifier 71, an IF amplifier 72 and a detecting circuit 73 constitute a receiving portion 74 as a whole. The receiving portion 74 is connected through a branch circuit 75 to a switching diode 76 of the transceiver side. The receiving portion 74 is also connected to a noise amplifying portion 80 which is constituted as a whole of a noise filter 77, a noise amplifier 78 and a detector 79. The noise amplifying portion 80 is connected through a circuit 81 and then a variable resistor 83 of a squelch control circuit 82 to a switching transistor 84 of the squelch control circuit. The collector 84c of the switching transistor 84 is connected through a circuit 85 to the switching diode 76 of the transceiver side. The collector 84c is also connected through a circuit 86 to the base 87b of a switching transistor 87 of the radio or tape recorder side. The collector 87c of the switching transistor 87 is connected through a circuit 88 to a switching diode 89 of the radio or tape recorder side. The diode 89 is connected through a circuit 91 to the radio or tape recorder set 90. Both the switching diode 76 of the transceiver side and the switching diode 89 of the radio or tape recorder side are connected respectively through the circuits 92 and 93 to an amplifier 94.

When a transceiver signal is received, it is filtered by the noise filter 77 to give a noise output alone, the noise output is amplified by the noise amplifier 78, detected by the detector 79 and then input to the base 84b of the switching transistor 84 in the squelch control circuit as a negative electric charge. This makes the transistor 84 cut off and results in development of the bias voltage at the collector 84c. With the development of the bias voltage at the collector 84c of the switching transistor 84, the diode 76 is made operative to apply the transceiver signal to the amplifier 94. On the other hand, the switching transistor 87 of the radio or tape recorder side is grounded to stop the function of the switching diode 89. This results in interruption of the audio signal from the radio or tape recorder to the amplifier 94.

When no transceiver signal is received, the switching transistor 84 of the squelch control circuit is made inoperative and results in inactivation of the switching diode 76, while the switching transistor 87 of the radio or tape recorder side is made operative to activate the diode 89 with the result of applying the audio signal of the radio or tape recorder set to the amplifier 94.

Further, as shown in broken lines, there can be connected in each case an RC circuit, or a time constant circuit, which comprises an electrolytic condenser C. In accordance with this configuration, there can be inserted a certain time lag on automatic switching operation between both signals and this enables prevention of eventual undesired switching when the transceiver signal is temporarily interrupted.

As above-mentioned, both switching transistors in the squelch control circuit and in the radio or tape recorder side are connected so as to function of each other and both switching diodes are connected to the respective switching transistor in order to carry out the switching operation. Consequently, such simplified circuits result in fewer transistors and lower cost than before.

Further, the variable resistor in the squelch control circuit can be switched for exclusive reception of a desired audio signal. Thus, it enables the combined transceiver and radio or tape recorder set to be used either as a transceiver or as a radio or tape recorder alone.

What is claimed is:

1. An improved automatic switching system in a combination transceiver set and radio or tape recorder set which contains an output amplifier circuit, a first source of audio signals and a first audio output circuit, and means associated with the transceiver set for receiving audio signals and for reproducing said received audio signals including a second audio output circuit, comprising:
- a first switching transistor in the first audio output circuit;
- a first diode between the first audio output circuit and the output amplifier circuit;
- a noise squelching circuit in the transceiver;
- a second switching transistor in the noise squelching circuit;
- a second diode between the second audio output circuit and the output amplifier circuit; and
- circuit means responsive to the second switching transistor upon the receipt of audio signals by the transceiver set, to cause the first switching transistor to bias the first diode to cut-off condition and to bias the second diode to conducting condition whereby to operatively connect only the second audio output circuit with the output amplifier circuit.

2. An improved automatic switching system as in claim 1, wherein said circuit means is responsive to the second switching transistor upon the cessation of the receipt of audio signals by the transceiver set, to cause the first switching transistor to bias the first diode to conducting condition and to bias the second diode to cut-off condition whereby to operatively connect only the first audio output circuit with the output amplifier circuit.

3. An improved automatic switching system as in claim 1, wherein said first switching transistor includes base, emitter and collector electrodes; means connect the emitter-collector circuit of the first switching transistor to ground; and said circuit means is connected to the base of the first switching transistor, whereby to bias said first switching transistor to conducting condition upon the receipt of audio signals by the transceiver set.

4. An improved automatic switching system as in claim 1, wherein the transceiver set includes a noise filter, a noise amplifier and a detector connected in series with the second audio output circuit for causing said second switching transistor to become operable to control the first switching transistor to bias said first diode to cut-off condition and to bias the second diode to conducting condition.

5. An improved automatic switching system as in claim 1, wherein the noise squelching circuit includes a variable resistor for controllably biasing the second switching transistor.

6. An improved automatic switching system as in claim 5, wherein the variable resistor is adjustable to a first condition to cause said circuit means to control the first switching transistor to bias the first diode to cut-off condition and to bias the second diode to conducting condition, said variable resistor being adjustable to a second condition to control said first switching transistor to bias the first diode to conducting condition and to bias the second diode to cut-off condition.

7. An improved automatic switching system as in claim 1, which further includes a time delay circuit for delaying the biasing of said first diode to conducting condition for a predetermined period of time after the cessation of receipt of audio signals by the transceiver.

8. An improved automatic switching system as in claim 7, wherein the time delay circuit is connected to the first switching transistor.

* * * * *